E. GRUENFELDT.
MOTOR VEHICLE CONSTRUCTION.
APPLICATION FILED DEC. 21, 1910.
1,110,199.
Patented Sept. 8, 1914.
2 SHEETS—SHEET 1.
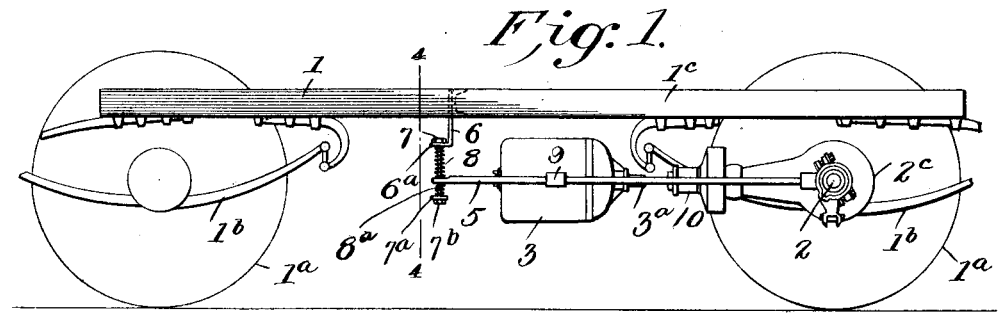
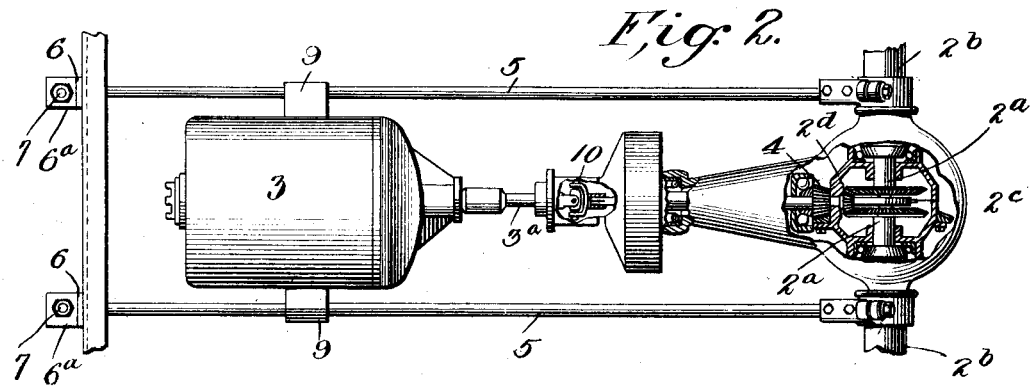
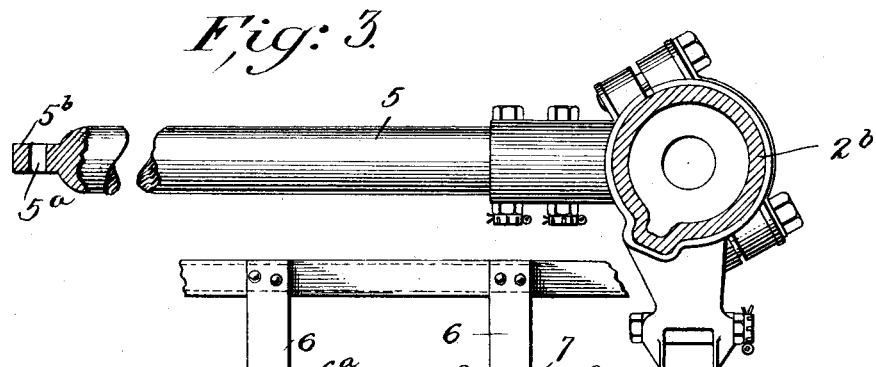
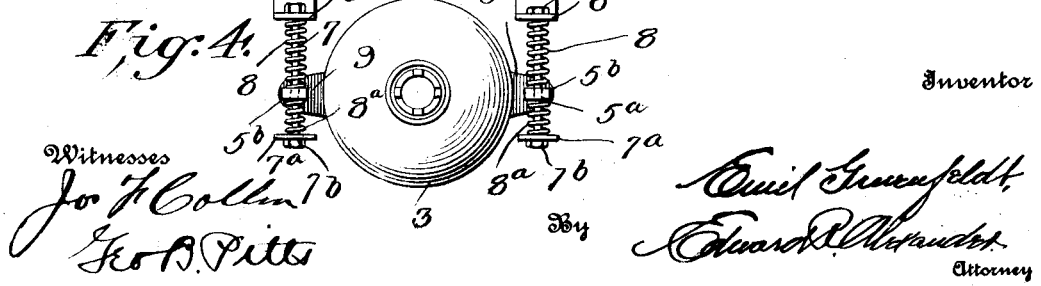
Witnesses
Inventor
Attorney

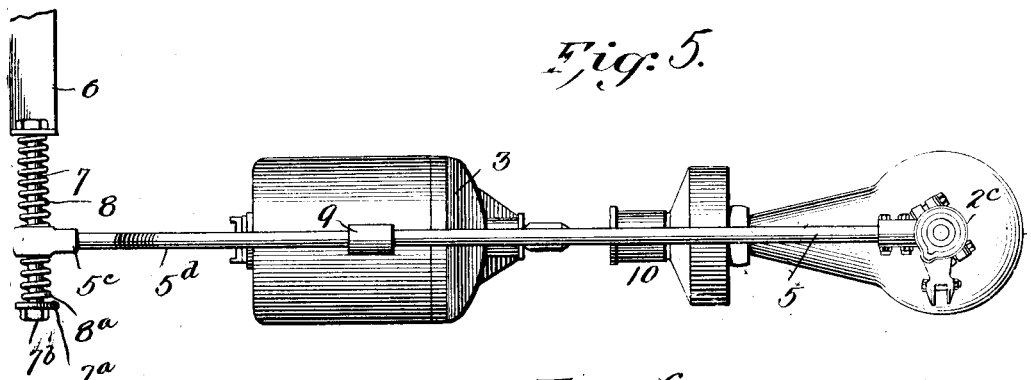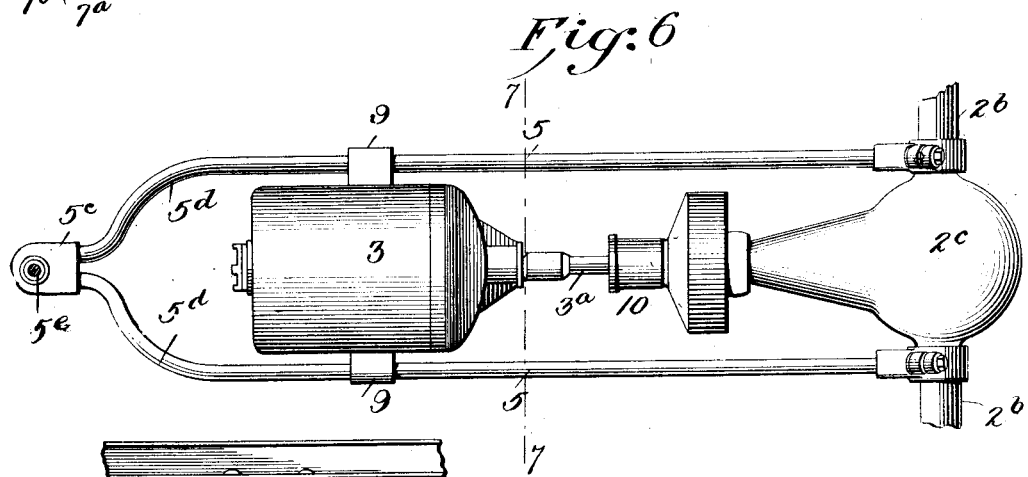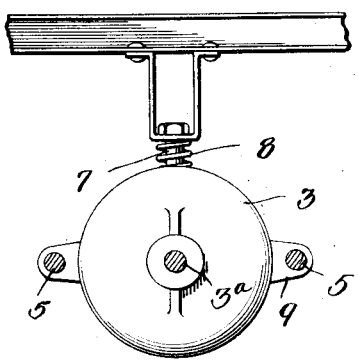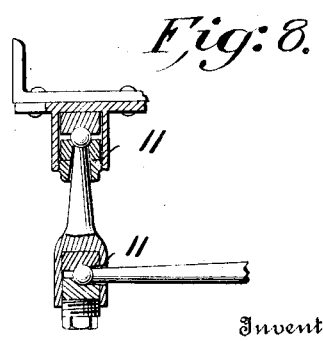

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE CONSTRUCTION.

1,110,199.

Specification of Letters Patent.  Patented Sept. 8, 1914.

Application filed December 21, 1910. Serial No. 598,540.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Motor-Vehicle Construction, of which the following is a specification.

My invention relates to motor vehicle constructions and more particularly to the arrangement and mounting of an electric motor and drive or propeller shaft mechanism relative to a rear axle having live driven shaft sections.

In the drawings: Figure 1 is a side view of the chassis of a motor vehicle with the wheels on the near side thereof removed. Fig. 2 is a view partly in top plan and partly in section of a portion of the chassis. Fig. 3 is a view partly in side elevation and partly in section of one of the reach rods. Fig. 4 is a section on the line 4—4 of Fig. 1. Fig. 5 is a side elevation of a modified form of construction. Fig. 6 is a top plan view of the same. Fig. 7 is a section on the line 7—7 of Fig. 6. Fig. 8 is a view partly in side elevation and partly in section of a modified form of support for the front end of a reach rod or rods.

In the drawings, 1 indicates the chassis of the vehicle, $1^a$ indicates the wheels and $1^b$ the springs on which the frame $1^c$ is mounted. These parts may be of any standard or preferred form of construction.

2 indicates the rear axle comprising live axle sections $2^a$, $2^a$, housings or casings therefor $2^b$, $2^b$; differential housing $2^c$ and differential $2^d$.

3 indicates an electric motor, $3^a$ indicates a drive or propeller shaft which is driven by the motor 3. This shaft is connected at one end to the armature shaft of the motor and at its opposite end to a gear or mechanism 4, which latter drives the live axle sections $2^a$, $2^a$, through the differential $2^d$.

5, 5, indicate a pair of arms or rods, each rigidly connected at its rear end to the housing of the rear axle 2 and extending forwardly therefrom beyond the front end of the motor 3.

$5^a$ indicates an eye or opening formed in the front end of each arm 5, the opposite sides of the arm being flattened, as shown at $5^b$, to form bearing surfaces.

6, 6, indicate hangers depending from the chassis and each preferably provided with a horizontally extending member or projection $6^a$.

7 indicates headed rods or bolts, each supported by one of the hangers 6. The rods 7 extend vertically downward from the hangers 6 and are spaced apart from each other, whereby they aline with and extend through the openings $5^a$ of the arms 5. The head of each rod or bolt engages with the upper surface of the lateral projection $6^a$ of the hanger 6 which supports it.

$7^a$ indicates a supporting device such as a washer, mounted on the lower or free end of each bolt or rod 7 and held thereon by a nut $7^b$.

8, $8^a$, indicate compression springs surrounding each rod 7 and arranged thereon above and below the adjacent arm 5. As will be seen, one end of the spring 8 rests upon the adjacent arm 5 and its opposite end bears against the under surface of the projection $6^a$; while one end of the spring $8^a$ bears against the said arm 5 and its opposite end rests upon the support or washer $7^a$. The spring $8^a$ for each arm 5 is preferably heavier and stronger than the spring 8, because it supports one end of the adjacent arm 5 and also a portion of the weight of the motor, as will be later described. But as shown in the drawings, the springs 8 and $8^a$ are of a size and strength, and also proportioned relative to each other to normally maintain the arms 5, 5, in a substantially horizontal position.

9 indicates devices for supporting the motor 3 on and rigidly connecting it to the arms 5. The devices 9 project from opposite sides of the motor or motor casing and are preferably formed with openings through which the arms 5 extend. The devices 9 and arms 5 are secured together in any suitable manner so as to make the motor 3 and arms 5 rigid relative to each other.

Referring particularly to the construction illustrated in Figs. 5, 6 and 7, it will be seen that the construction has been slightly modified. In this form of the construction, the arms 5, 5, are connected together by a yoke $5^c$ at a point beyond or in front of the motor 3. Preferably the arms 5, 5, are curved inwardly as shown at $5^d$, $5^d$, with their free ends arranged side by side and rigidly fixed together by the yoke 5ᶜ. 5ᵉ indicates an opening formed in the yoke 5ᶜ and arranged preferably in the vertical plane of the axis of the shaft 3ᵃ. As is clearly shown in the drawings, in this form of this invention only one rod 7, which alines with and projects through the opening 5ᵉ, and a set of compression springs 8, 8ᵃ, are required.

While in the drawings as represented by the numeral 10, I have shown a universal joint, it is not absolutely essential, and while through the instrumentality of this joint longitudinal movement of the armature shaft and drive or propeller shaft, relative to the rear axle mechanism is permitted, the same is not absolutely essential. Instead of yielding supporting mechanism for the front ends of the arms or rods 5, such as hereinbefore described and which yielding supporting mechanism permits substantially a universal movement, at least to a slight degree, of the front ends of the said arms or rods, a universal joint may be utilized for supporting the rods at the front end as illustrated in Fig. 8, the universal joints being designated by the character 11.

It will be noted that the motor, rear axle and the drive connections or power transmitting mechanism between the armature shaft of the motor and the live shaft sections of the rear axle are so supported correlated and connected together that no relative movement of these parts in directions to cause disalinement of the armature shaft, propeller shaft and rear axle mechanism can be effected due to any normal conditions met with in the operation of the motor or road conditions to which the rear drive wheels of the vehicle may be subjected. In this connection it may be stated that my present invention is an improvement upon my invention as disclosed in Letters Patent of the United States No. 941,517, dated November 30, 1909, inasmuch as I have herein provided against any possibility of relative detrimental movement of the motor and the combined torsion and reach rods which support the motor. Through the instrumentality of these rods and the rear axle and motor housings the motor shaft, drive or propeller shaft and the shaft connections between the latter and the differential mechanism of the rear axle are held in rigid alinement with each other, irrespective of the movements of either the motor or the rear axle relative to the frame of the vehicle. In other words the motor, the drive connections between the motor and the rear axle, the arms, and rear axle housing must always move together as a unitary structure.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. In electric motor vehicle construction, the combination of a vehicle frame, a rear axle, including a housing and live axle sections, springs for supporting the said frame upon the axle, a pair of arms rigidly connected to said rear axle housing and extending forwardly therefrom, means for yieldingly supporting said arms at their front ends, compression springs between the yieldingly supported ends of the arms and the vehicle frame, an electric motor arranged between the said arms and having direct shaft drive connection with and at right angles to the live axle sections of said rear axle, and devices for rigidly connecting the motor to the arms at points thereon intermediate the rear axle and their yieldingly supported ends, whereby the motor, drive connections, arms and rear axle housing must always move together as a unitary structure.

2. In electric motor vehicle construction, the combination of a vehicle frame, a front axle and wheels supporting the front end of said frame, a rear axle including a housing and live axle sections, springs interposed between said axle housing and the frame, rear drive wheels on the live axle sections, a pair of arms each rigidly connected at its rear end to the rear axle housing and at its front end having movable connection with the said frame, an electric motor arranged between and rigidly secured at opposite sides to said arms, the armature shaft of said motor being arranged at right angles to said rear axle, and a drive shaft interposed between the rear end of said armature shaft and the said rear axle to transmit power one from the other whereby the motor, drive connections, arms and rear axle housing must always move together as a unitary structure.

3. In electric motor vehicle construction, the combination of a vehicle frame, a rear axle, including a housing and live axle sections, springs interposed between said frame and axle, an electric motor, a driving connection between said motor and the live sections of said rear axle including a drive shaft alined with the armature shaft of the motor and a compensating gear, a pair of arms arranged upon opposite sides of the motor, the said arms being rigidly connected at one end to the said rear axle housing and extending therefrom forwardly beyond the motor, compression springs interposed above and below the said arms arranged at or near the front ends thereof and permitting the arms to move upwardly and downwardly, and devices for rigidly connecting the motor to the said arms whereby the motor, drive connections, arms and rear axle housing must always move together as a unitary structure.

4. In electric motor vehicle construction, the combination of a vehicle frame, a rear axle including a housing and live axle sections, springs interposed between said frame and axle, an electric motor a driving connection between said motor and the live sections of said rear axle, including a drive shaft alined with the armature shaft of the motor, and a compensating gear, a pair of arms arranged upon opposite sides of the motor, the said arms being rigidly connected at one end to the said rear axle housing and extending therefrom forwardly beyond the motor, a yoke or device for rigidly connecting the arms together forward of the motor, compression means for movably supporting the said yoke or device, and permitting movement of the said connected ends of the arms relative to the vehicle frame upwardly and downwardly, and devices for rigidly connecting the motor to the said arms, whereby the motor, drive connections, arms and rear axle housing must always move together as a unitary structure.

In testimony whereof I affix my signature, in the presence of two witnesses.

EMIL GRUENFELDT.

Witnesses:
 NATHANIEL PLATT,
 SAMUEL ELKIND.